No. 745,742. PATENTED DEC. 1, 1903.
W. J. TAUBE.
CHECK VALVE.
APPLICATION FILED OCT. 25, 1902.
NO MODEL.
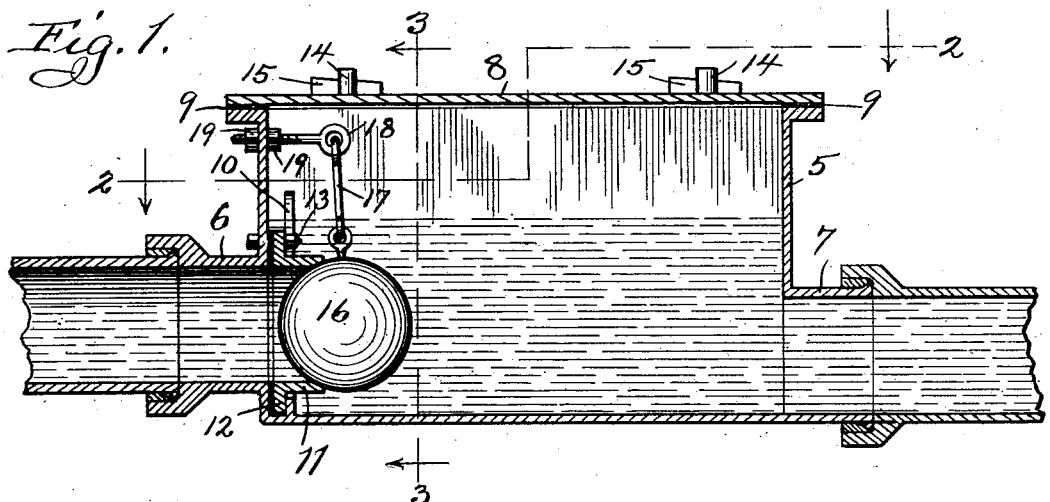
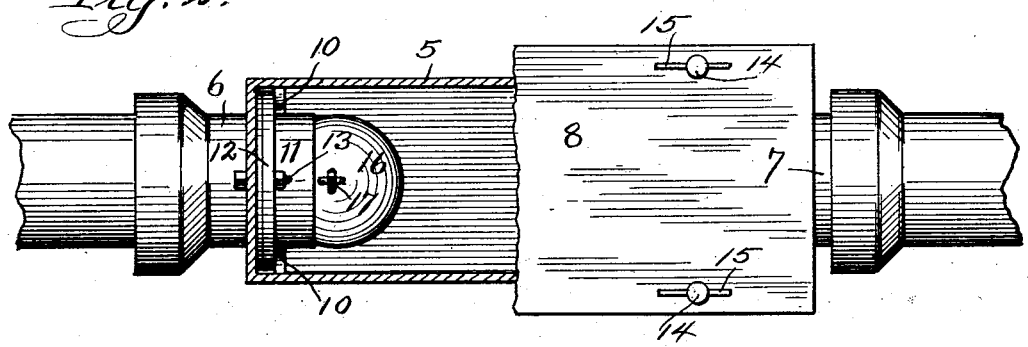
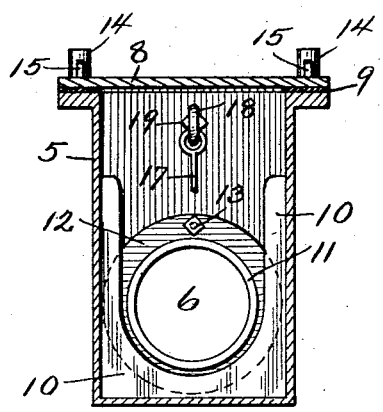
Witnesses:
R. J. Jacker
William E. Swanson
Inventor:
William J. Taube
T. J. McCoulogue No. 745,742. Patented December 1, 1903.

UNITED STATES PATENT OFFICE.

WILLIAM J. TAUBE, OF PARKRIDGE, ILLINOIS.

CHECK-VALVE.

SPECIFICATION forming part of Letters Patent No. 745,742, dated December 1, 1903.

Application filed October 25, 1902. Serial No. 128,762. (No model.)

*To all whom it may concern:*

Be it known that I, WILLIAM J. TAUBE, a citizen of the United States, residing at Parkridge, county of Cook, State of Illinois, have invented a new and useful Check-Valve, of which the following is a specification.

My invention relates to improvements in check-valves in which a movable valve is automatically opened or closed by the flow of the liquid and is shown and described in connection with house-drains for sewers, but can be used for any other suitable purpose.

The objects of my improvement are, first, to provide an easily-actuated valve; second, to afford facilities for the proper adjustment of the valve; third, to afford an easy access to the valve; fourth, to provide a valve which will not be affected by corrosion or rust, and, fifth, to provide an absolute check for backwater in sewers. I attain these objects by the mechanism illustrated in the accompanying drawings, in which—

Figure 1 is a vertical longitudinal section of the device embodying my invention; Fig. 2, a plan section on line 2 2 of Fig. 1, and Fig. 3 a cross-section on line 3 3 of Fig. 1.

Similar numerals refer to similar parts throughout the several views.

The valve-chamber 5 has the inlet 6 and outlet 7, which are preferably cast integral therewith and are provided with the ordinary pipe connections. Resting on the edge or flange surrounding the open upper part of the valve-chamber 5 is the cover 8, and a gasket 9 is preferably interposed between the two. An inwardly-projecting flange 10 is shown secured to and preferably integral with the bottom and two sides of the chamber as one means of securing the valve-seat 11 in proper place concentric with the inlet 6. The flange 12 of the valve-seat 11 is slipped down between the flange 10 and the end wall of the chamber 5 and secured in place by any convenient means, as by bolt 13. A gasket may or may not be interposed between the valve-seat and the wall of the chamber 5.

For convenience this check-valve is often placed underground in the ordinary location of drains, and naturally the moisture from the earth corrodes and rusts the different parts of the valve and chamber. To overcome the difficulties encountered from this source, the cover 8 is held secure by having apertures through which the pins or bolts 14 project, and a wedge-shaped key 15 is driven into the transverse hole in the pin 14 above the cover. The valve-seat 11 is made of some non-corrosive material, preferably lead, and is shaped to make the best possible seat for the valve.

The valve 16 is of spherical or conical contour where it contacts with the valve-seat 11, but may be of any convenient or desired shape otherwise and is made of any suitable material. The valve 16 is supported in any convenient manner to normally lie against the valve-seat 11 and close the passage from the inlet 6. Under ordinary conditions when the main sewer, with which the outlet 7 connects, is free from any obstructions or overflow the waste-water will flow into the valve-chamber through the inlet 6 and from thence out through the outlet 7 and into the main sewer. The force of the water coming in through the inlet 6 will force the valve 16 back away from the valve-seat 11 a sufficient distance to allow the water to enter the valve-chamber 5. When, however, the water in the main sewer rises for some reason to a higher level than the water in the inlet 6, the water will also rise in the valve-chamber, as shown in Fig. 1 of the drawings, the water having free and uninterrupted access to the chamber from the main sewer through the outlet 7, and will force the valve 16 against the valve-seat 11 with greater pressure than it normally is held, thereby absolutely preventing any passage of water from the valve-chamber to the inlet-pipe 6. It is obvious that when the water in the valve-chamber recedes again to slightly below the level of the water in the inlet 6 the flow will be again as formerly described—that is, into the chamber from inlet 6 and out of the chamber through outlet 7.

To show one means by which the valve 16 may be supported in place, I have illustrated one end of a link 17 loosely connected to the valve 16, while the opposite end of the link is loosely attached to an adjustable bolt 18, which is capable of longitudinal adjustment in the wall of the valve-chamber by means of the set-nuts 19. The purpose of having the adjustability is to give the valve the desired normal pressure against the valve-seat, particularly so when the outlet 7 is considerably lower than the inlet 6.

I wish to be understood that I reserve the right to make such changes in the form, proportion, and detail of construction as shall not be a departure from the spirit and scope or sacrifice any of the advantages of the following claim.

Having described my invention, what I claim, and desire to secure by Letters Patent, is—

The combination, in a check-valve, of the valve 16, supported by link 17 and bolt 18, to normally rest against the valve-seat 11, the flange 10 for securing the valve-seat in place, inlet 6, outlet 7, chamber 5, cover 8, pins 14, and wedges 15, all substantially as described, for the purpose specified.

In testimony whereof I have signed my name to this specification in the presence of two subscribing witnesses.

WILLIAM J. TAUBE.

Witnesses:
HOWARD COLLVER,
T. J. McCONLOGUE.